United States Patent
Fisher et al.

(10) Patent No.: US 7,484,119 B2
(45) Date of Patent: Jan. 27, 2009

(54) METHOD, APPARATUS, COMPUTER PROGRAM AND COMPUTER PROGRAM PRODUCT FOR ADJUSTING THE FREQUENCY AT WHICH DATA IS BACKED UP

(75) Inventors: David James Fisher, Bournemouth (GB); Stephen James Hobson, Hampton (GB); Paul Hopewell, Chandlers Ford (GB); Paul Kettley, Winchester (GB); Robert Daniel Millar, Fareham (GB); Pete Siddall, Romsey (GB); Stephen Richard Walker, Lockerley (GB)

(73) Assignee: International Business Machines Corporation, Armonk, NY (US)

( * ) Notice: Subject to any disclaimer, the term of this patent is extended or adjusted under 35 U.S.C. 154(b) by 537 days.

(21) Appl. No.: 11/255,204

(22) Filed: Oct. 20, 2005

(65) Prior Publication Data

US 2006/0117221 A1    Jun. 1, 2006

(30) Foreign Application Priority Data

Nov. 5, 2004    (GB)    ................. 0424488.5

(51) Int. Cl.
*G06F 11/00*    (2006.01)
(52) U.S. Cl. ................ 714/15; 714/5; 714/6; 707/202; 707/204; 711/162
(58) Field of Classification Search ............ 714/5, 714/6, 15; 707/202, 204; 711/162
See application file for complete search history.

(56) References Cited

U.S. PATENT DOCUMENTS

| 5,778,165 | A | | 7/1998 | Saxon |
| 5,854,754 | A | * | 12/1998 | Cabrera et al. ................. 703/2 |
| 7,055,063 | B2 | * | 5/2006 | Leymann et al. .............. 714/16 |
| 7,085,904 | B2 | * | 8/2006 | Mizuno et al. .............. 711/162 |
| 7,139,846 | B1 | * | 11/2006 | Rossi ............................ 710/6 |
| 2004/0098423 | A1 | | 5/2004 | Chigusa et al. |
| 2006/0101083 | A1 | * | 5/2006 | Cherkauer et al. .......... 707/200 |
| 2007/0067586 | A1 | * | 3/2007 | Mikami ..................... 711/162 |

OTHER PUBLICATIONS

"Tivoli Storage Manager For Windows Backup-Archive Clients Installation and User Guide" http://webdocs.caspur.it.ibm/web/tsm-5.1/aix/html/winc/ans60073.htm.
"Incremental Backup and Recovery" http://publib.boulder.ibm.com/infocenter/db2v8luw/topic/com.ibm.db2.udb.doc./admi . . . .
"Deciding How Often To Back Up" http://publib.boulder.ibm.com/infocenter/db2v8luw/topic/com.ibm.db2.udb.doc./admi . . . .
"Turning Instance Recovery Performance" http://www.doc.gold.ac.uk/oracle/doc/server.817/a76992/chx_inst.htm.

\* cited by examiner

*Primary Examiner*—Robert Beausoliel
*Assistant Examiner*—Philip Guyton
(74) *Attorney, Agent, or Firm*—Van Leeuwen & Van Leeuwen; Herman Rodriguez

(57) ABSTRACT

Disclosed is a method, apparatus, computer program and computer program product for adjusting the frequency at which data is backed up. This involves receiving a target recovery time. A current estimated recovery time is then determined and the current and target times are compared. If it is determined that the current estimated recovery time has reached a predetermined threshold relative to the received target recovery time a new backup should be initiated.

17 Claims, 6 Drawing Sheets

METHOD, APPARATUS, COMPUTER PROGRAM AND COMPUTER PROGRAM PRODUCT FOR ADJUSTING THE FREQUENCY AT WHICH DATA IS BACKED UP

FIELD OF THE INVENTION

The present invention relates to data processing system and more particularly to the persisting of data against some kind of system failure.

BACKGROUND OF THE INVENTION

Administrators of systems such as IBM's WebSphere® MQ protect their persistent data against loss or corruption caused by hardware or software failure or other problems by performing a "fuzzy" backup periodically. This involves taking a full backup of, for example, a database at time x and then continuing to record changes to the database in a log until the time when the next full backup is complete. Recovery is achieved by restoring from the backup and then replaying the log.

Some systems (for example WebSphere MQ) automate the backup process and this substantially improves usability. Automating the backup itself is relatively straightforward and is not addressed by this patent application. Determining the frequency at which such backups should be initiated is however more of a problem.

Various attempts at addressing this problem have been made. IBM have published the following at http://publib.boulder.ibm.com/infocenter/db2help/index.jsp?topic=/com.ibm.db2. udb.doc/admin/c0005955.htm: "If the amount of time needed to apply archived logs when recovering and rolling a very active database forward is a major concern, consider the cost of backing up the database more frequently. This reduces the number of archived logs you need to apply when rolling forward."

Tivoli have published the following at http://webdocs.caspur.it/ibm/web/tsm-5.1/aix/html/winc/ans60073.htm:

"The Tivoli Storage Manager Backup and Restore windows provide an estimate function that estimates the amount of time required to process your files and directories. The estimated transfer is a rough calculation of the time it takes to transfer your data. This estimate is based on previous transfers of data between your workstation and the current Tivoli Storage Manager server. The actual transfer time could be longer or shorter than the estimate due to factors like network traffic, system load on your workstation, or system load on the server.

The Estimated Transfer Time is based on previous backup transfer rate, so you must run at least one backup operation first. The Estimated Transfer Time field reads N/A if no files are sent to or from the current Tivoli Storage Manager server. The estimate function also does not take into account whether or not files are excluded from backup. The assumption made by the estimation algorithm is that all the files selected will be sent to the server."

Further Oracle's database documentation (http://www-.doc.gold.ac.uk/oracle/doc/server.817/a76992/chx_inst.htm) details parameters to tune backup size and frequency and details of how to estimate recovery time for a given backup size. The documentation then goes on to detail how to adjust the recovery time to within your desired range.

Various patents/applications address the subject of backing up data. See for example U.S. Pat. No. 5,778,165 and US 2004/0098423.

The prior art does not however provide for an autonomic mechanism for determining the frequency at which data should be backed up.

SUMMARY OF THE INVENTION

According to a first aspect, the present invention provides a method for adjusting the frequency at which data is backed up, comprising: receiving a target recovery time; and determining whether to initiate a new backup, the step of determining whether to initiate a new backup comprising: determining a current estimated recovery time; comparing the current estimated recovery time with the received target recovery time; and responsive to determining that the current estimated recovery time has reached a predetermined threshold relative to the received target recovery time, initiating a new backup.

In a preferred embodiment, estimated recovery time comprises the time taken to replay a previous backup and the time taken to replay logged changes to the previous backup. In the preferred embodiment, the current estimated recovery time is estimated by monitoring the time taken to create the previous backup, determining a current log replay time and using the time taken to create the previous backup and the current log replay time to determine a current estimated recovery time.

In a preferred embodiment the current log replay time is determined by calculating the number of bytes written to the log since the start of the previous backup, determining a log write bandwidth and dividing the number of bytes written by the log write bandwidth.

If it is determined that it is not possible to meet the target recovery time, then the predetermined threshold may be adjusted.

Preferably the time taken to write the next backup is also taken account of when determining whether a new backup should be initiated.

In another embodiment the estimated time to replay changes logged whilst the next backup is written is taken account of when determining whether a new backup should be initiated.

Further preferably other factors may be taken account of when determining whether a new backup should be initiated—e.g. that the backup must first be retrieved from a building 10 miles away before recovery can start.

According to a second aspect there is provided apparatus for adjusting the frequency at which data is backed up, comprising: a receiving component for receiving a target recovery time; and a first determining component for determining whether to initiate a new backup, the first determining component comprising: a second determining component for determining a current estimated recovery time; a comparing component for comparing the current estimated recovery time with the received target recovery time; and an initiator, responsive to determining that the current estimated recovery time has reached a predetermined threshold relative to the received target recovery time, for initiating a new backup.

The invention may also be implemented in computer software.

BRIEF DESCRIPTION OF THE DRAWINGS

A preferred embodiment of the invention will now be described, by way of example only, and with reference to the following drawings.

DETAILED DESCRIPTION

This disclosure describes a mechanism which allows a system to determine the frequency with which data should be backed up. The mechanism described herein adapts autonomically to variations in workload and to the replacement of hardware or software with faster (or slower) versions.

In order to restore a system following some kind of failure, it is first necessary to restore from the full backup and then to replay the log in order to bring the data up to date.

Thus the dominant factors involved in a restore are:
(i) Restore Time for Full Backup
  This is affected by the amount of data on the backup and the rate that data can be read.
(ii) Log Replay Time
  The replay time is bytes to replay divided by read bandwidth.

It is acknowledged that none of these assumptions are exactly true but it is nevertheless asserted that these estimations are good enough for this type of application.

Figure 1:
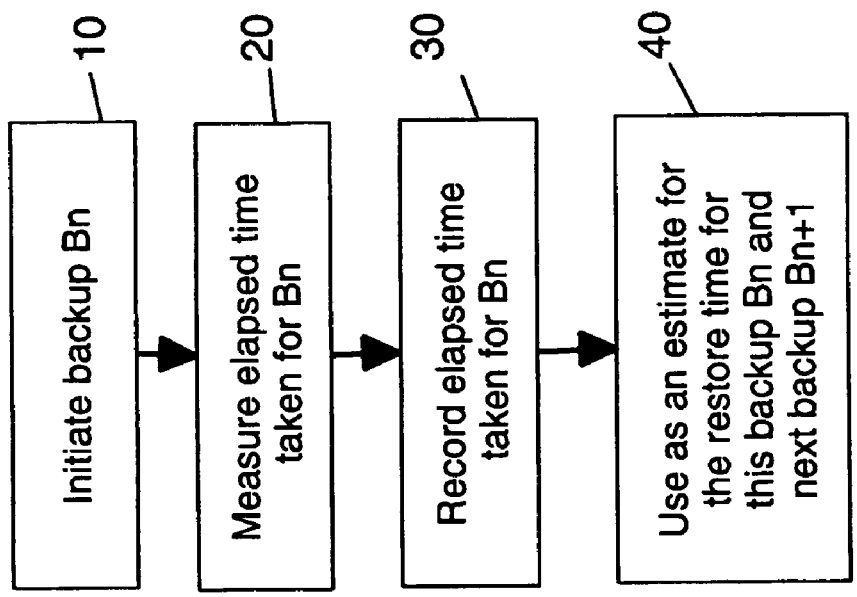
FIG. 1 illustrates the process of initiating and monitoring a backup in accordance with a preferred embodiment of the present invention.

An overview of the processing of the present invention in order to restore the backup is shown with reference to FIG. 1.

Note it has been appreciated by the inventors that the number of bytes in a backup is roughly the same for consecutive backups. Further the read bandwidth is roughly the same as write bandwidth. Given the above assumptions, when the invention (in accordance with a preferred embodiment) is first deployed on a system, the system initiates a backup Bn (step 10). The elapsed time for this backup is measured and recorded (steps 20, 30). The elapsed time is then used as an estimate for the restore time for this backup (Bn) (step 40) and for the backup time for the next backup (Bn+1). This repeats so that the system always uses the measured time for the most recent backup (Bn) as its estimate for the restore time for that backup (Bn) and the backup time for the next backup (Bn+1).

The system maintains two additional statistics in order to determine log replay time:
(i) The total amount of data (bytes) written to the log since the start of the most recent backup; and
(ii) The rate at which data is written to the log. The average log write bandwidth is estimated by sampling the time for a log write in order to create an average write bandwidth. As mentioned above, it has been appreciated that the write bandwidth is approximately equal to the read bandwidth.

Figure 2:
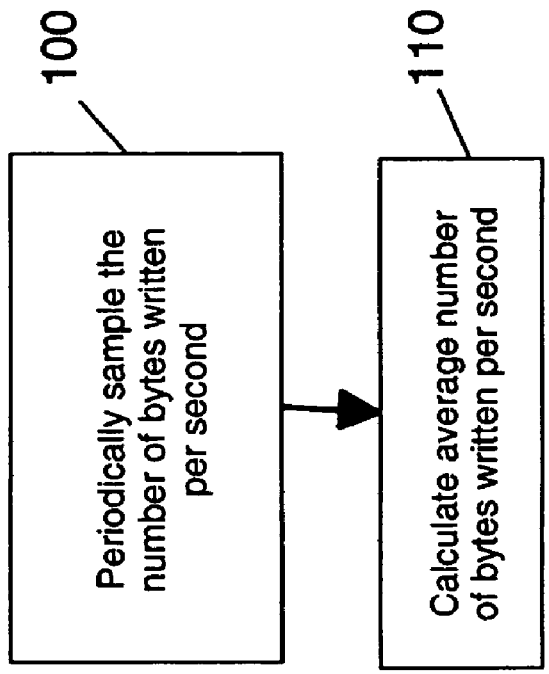
FIG. 2 illustrates the process of calculating a log write bandwidth in accordance with a preferred embodiment of the present invention.

FIG. 2 illustrates the processing by which an average time can be estimated for reading 1 byte of data from the log. The number of bytes written per second can be sampled (step 100) and then an average from any such samples can be calculated (step 110). Note, for the sake of ease it might be preferable to sample the number of bytes written every x (e.g. 10) seconds and then divide the average by x. In order to determine log replay time, the number of bytes written since the last backup was initiated is divided by the average write time.

Figure 3:
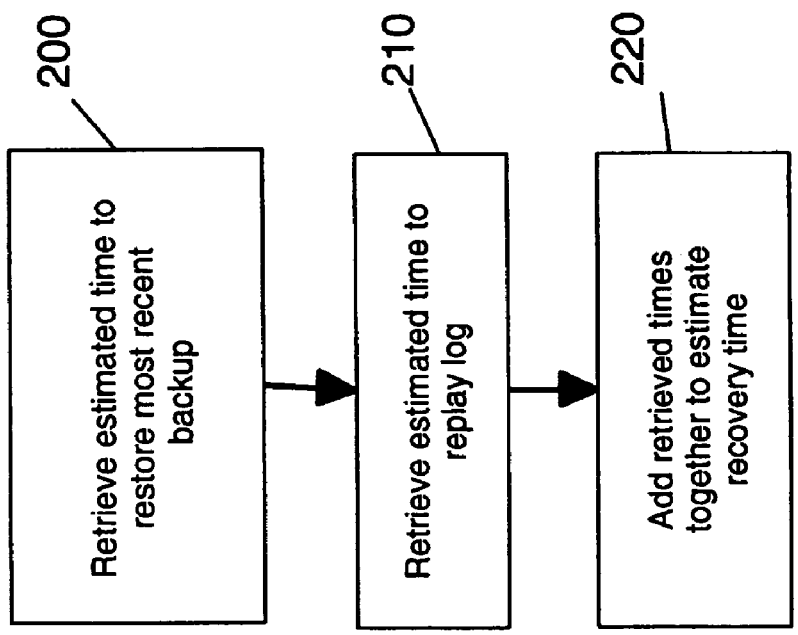
FIG. 3 shows the process for estimating recovery time in accordance with a preferred embodiment.

FIG. 3 shows how the system then estimates recovery time from the statistics maintained. At step 200, the system retrieves the calculated time to restore the most recent backup (estimated as the time to write that backup—steps 20 and 30 of FIG. 1). At step 210, the system further retrieves the average log write bandwidth (based on sampling the time for log writes—steps 100, 110 of FIG. 2. Alternatively each log write can be timed.)

The system can then estimate the recovery time at step 220 as: The time to restore the most recent backup (estimated as the time to write that backup) plus the time to replay the log (estimated as the bytes written divided by the log write bandwidth).

Figure 4:
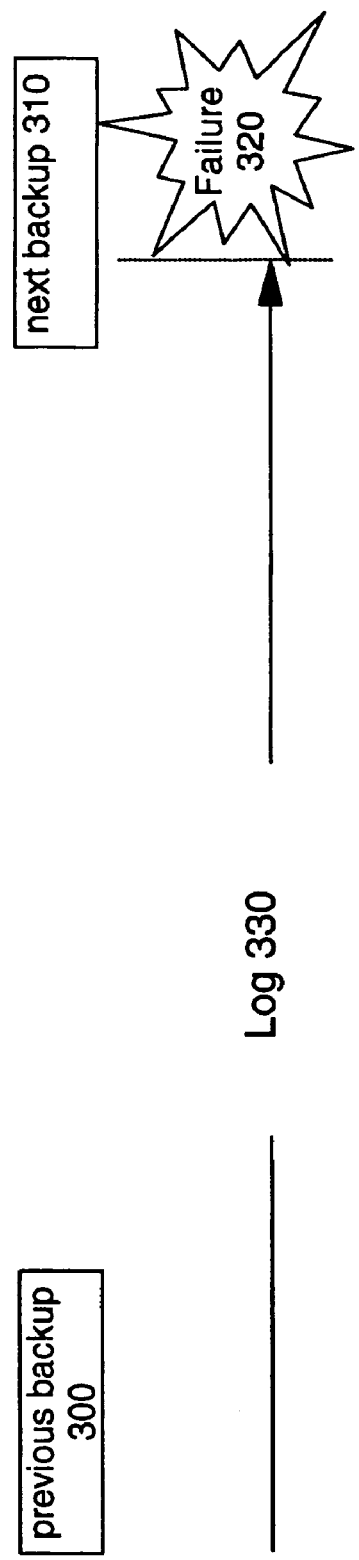
FIG. 4 shows a problem that occurs when a system failure occurs in the middle of taking a backup.

Note, it is preferable if additionally the time to restore the next backup is also factored into this equation (i.e. is added to the result obtained above). The reason for this will be explained with reference to FIG. 4. The figure shows how a backup 300 is taken and whilst this is happening the system logs any additional changes to the data being backed up 330. At a later time, the system initiates another backup 310. In the middle of that backup the system fails 320. At replay time, it is necessary not only to restore backup 300 but also to restore the log up to the time of system failure. This will never be more than the time to restore the next backup 310.

Note, instead of factoring the time taken to restore the next backup another approach may be taken. It could be determined (based on the previous log write speed) how long it would take to replay all changes written to the log whilst the next backup is being taken. This time could then be factored into the equation instead.

Thus it has been shown how to derive all the variables necessary, in the preferred embodiment, to estimate current recovery time.

The backup time is going to be reasonably constant (unless large changes are made, in which case the first backup following such changes will take longer). Thus in order to meet a specified target recovery time, it is the log replay time that can be varied. Thus to ensure that the specified target recovery time can always be met, the system must initiate the next backup early enough. That is, it is preferable that it is possible to recover the previous backup, replay the logged changes and complete the next backup within the specified target recovery time—see FIG. 4 for a more detailed explanation of why this is so.

The system has an estimate of how long the next backup will take (the time the previous backup took) and can estimate how much time is available before exceeding the target recovery time (see above) and hence it can determine the "right" time to initiate the next backup.

Figure 5:
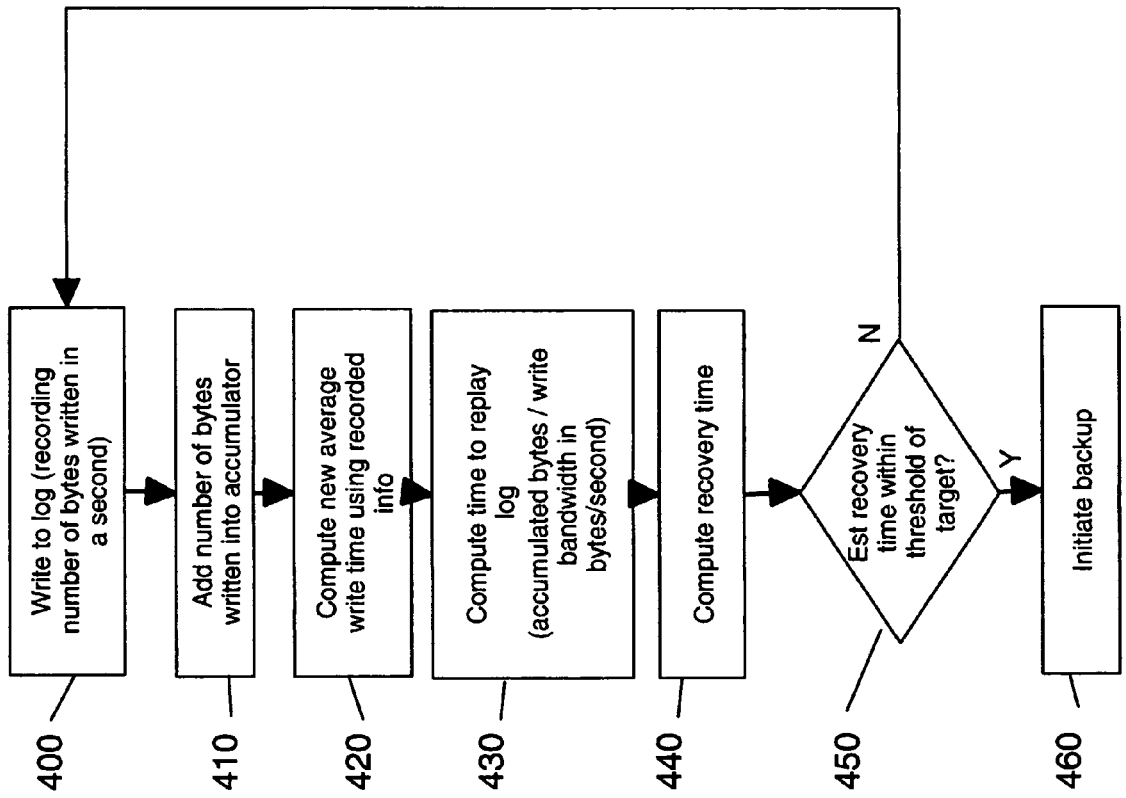
FIG. 5 illustrates the processing of the present invention in accordance with a preferred embodiment.

The processing of the present invention, in accordance with a preferred embodiment, will be described with reference to FIG. 5. Note it is assumed that the system has received a target recovery time from a user. This may be received through a graphical user interface (GUI) front-end or some other process.

The system writes to the log. At the same time as writing to the log the system calculates the number of bytes written in a second (records write bandwidth). This may be by recording the number of bytes written in x (e.g. 10) seconds and dividing this by x (step 400). The number of bytes written is added into an accumulator which is reset when a new backup is commenced (step 410). A new average write bandwidth is calculated factoring in the newly recorded write bandwidth (step 420)—see FIG. 2. The current time to replay the log is then computed at step 430. As previously discussed this is the accumulated number of bytes written to the log since the previous backup was initiated divided by write bandwidth as calculated at step 420/step 110. Using the newly computed time to replay the log, the current recovery time is then calculated (as described above)—step 440. It is then determined at step 450 whether the estimated recovery time is equal to or within a predetermined threshold of the target recovery time. If this is not the case, then it is permissible for the system to continue writing to the log. However, if the threshold has been reached then the next backup should be initiated straight away in order to meet the target recovery time (step 460).

For example, the first time round the estimated recovery time is 8 hours and the target recovery time is 10 hours. Some time later the estimated recovery time is 9.5 hours. The predetermined threshold is half an hour and consequently the next backup should be initiated immediately.

In an alternative embodiment the customer can allow/compensate for the necessarily approximate estimation by specifying a shorter recovery time target. Thus, a customer with a target of 10 hours might specify 9.5 hours as the target—giving an implicit threshold of 30 minutes. In this case the predetermined threshold is 0.

Note, it is the estimated values used to calculate recovery time that make it a good idea to compensate via the use of a threshold. It is unlikely that the calculated estimated recovery time will overstep the target recovery time by a large amount between one log write calculation and the next.

Note, the calculation used to determine whether a backup should be initiated (i.e. estimated recovery time) is time to recover previous backup+time to replay log+time for next backup. Alternatively the estimated recovery time may be taken as time for previous backup+time to replay log. The calculation used to determine whether a backup should be initiated is then that the estimated recovery time must not be greater than target recovery time−time for next backup. The result is the same either way.

Figure 6:
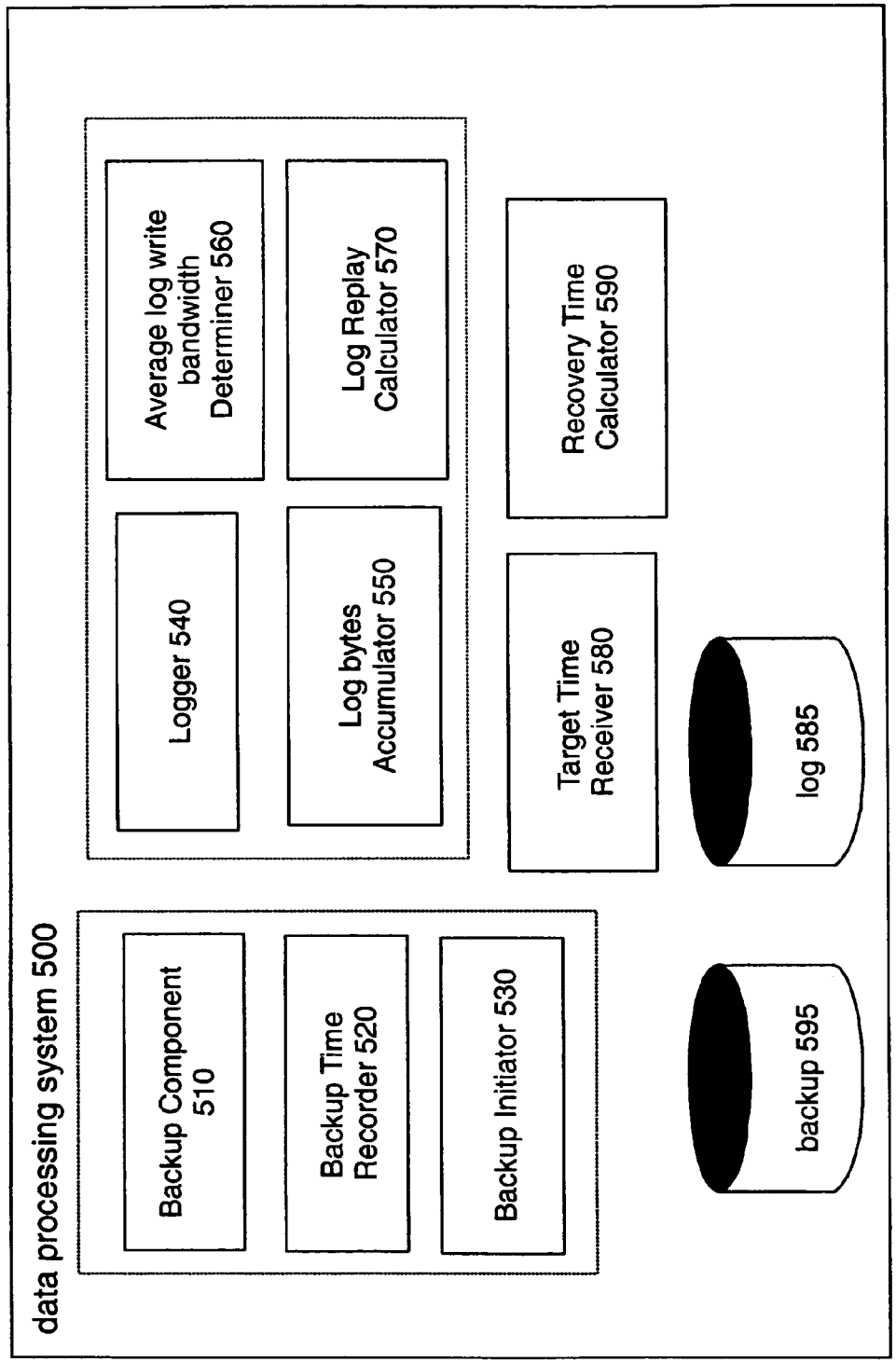
FIG. 6 shows the components of a data processing system in accordance with a preferred embodiment of the present invention.

It may be necessary to take other factors into account when calculating an estimated recovery time. This may be done specifically via an administrator (i.e. they may be factored into the calculation) or the user may take account of specific information when setting the target recovery time. For example, a user (or administrator) may know that the backup has to be retrieved from a building 10 miles away—in which case, this will influence the time to recovery. In other words, the time available (prior to the target recovery time being reached) for the restore (including log replay) will be reduced FIG. 6 shows the components of the present invention in accordance with a preferred embodiment. A data processing system 500 backs up data using backup component 510. Backup time recorder 520 records the time of the current backup. Backup initiator component 530 initiates backups 595 and will be discussed below. A logger 540 logs data to log 585. (Note the log and backup may be on the same disk. The log bytes accumulator 550 records the number of bytes written since the start of the previous backup. Average log write bandwidth Determiner 560 calculates average write bandwidth. Log Replay Calculator 570 uses the information from components 550 and 560 to determine an estimated time to replay the log. Target Time Receiver 580 receives a requested target recovery time from a user. A Recovery Time Calculator 590 calculates the current recovery time using information from components 520 (backup time recorder) and 570 (log replay calculator). Subsequent to every log write, backup initiator component 530 uses the recovery time calculated by component 590 and the target recovery time received by component 580 to determine whether to initiate a new backup.

The main advantage of the disclosure is that an administrator can specify a business objective (target recovery time), so that:

The information required can be easily understood by and specified by the administrator's clients (the business);

There is a better prospect of correctly tracking changing business imperatives;

The administrator does not need to understand and analyse the various processes and technologies involved in backup and recovery;

There is less (reduced) administrative burden;

The system adapts autonomically;

Frequency of backups is dynamically optimised; and

Recovery times are predictable.

Note, the invention has been described in terms of a fuzzy backup system (i.e. a system in which whilst a backup is being taken, changes to the system are logged). However it should also be appreciated that the invention is not limited to such. Such techniques may be used in a system where the system is shutdown whilst a backup is taken and then changes are logged upon system startup.

The invention claimed is:

1. A method for adjusting the frequency at which data is backed up, comprising:
   receiving a target recovery time; and
   determining whether to initiate a new backup, the step of determining whether to initiate a new backup comprising:
      determining a current estimated recovery time, wherein the current estimated recovery time comprises a time taken to replay a previous backup and a time taken to replay logged changes to the previous backup, and wherein the step of determining a current estimated recovery time comprises:
         monitoring a time taken to create the previous backup;
         determining a current log replay time; and
         using the time taken to create the previous backup and the current log replay time to determine a current estimated recovery time;
      comparing the current estimated recovery time with the received target recovery time; and
      responsive to determining that the current estimated recovery time has reached a predetermined threshold relative to the received target recovery time, initiating a new backup.

2. The method of claim 1, wherein the step of determining the current log replay time comprises:
   determining a number of bytes written to the current log since the start of the previous backup;
   determining a log write bandwidth; and
   dividing the number of bytes written by the log write bandwidth.

3. The method of claim 1 further comprising:
   taking account of a time taken to write a next backup when determining whether a new backup should be initiated.

4. The method of claim 1 further comprising:
   taking account of an estimated time to replay changes logged whilst a next backup is written when determining whether a new backup should be initiated.

5. The method of claim 1 further comprising:
   taking account of other factors when determining whether a new backup should be initiated.

6. The method of claim 1 wherein the comparing the current estimated recovery time with the received target recovery time further comprises:
   determining whether it is not possible to meet the target recovery time; and responsive to determining that it is not possible to meet the target recovery time, adjusting the predetermined threshold.

7. Apparatus for adjusting the frequency at which data is backed up, comprising:
   one or more processors;
   a memory accessible by the processors;
   a nonvolatile storage device where backups are stored; and
   a process stored in the memory and executed by at least one of the processors that performs steps comprising:
      receiving a target recovery time; and
      determining whether to initiate a new backup, the determining comprising:
         determining a current estimated recovery time, wherein the current estimated recovery time comprises a time taken to replay a previous backup and a time taken to replay logged changes to the previous backup, and wherein the step of determining a current estimated recovery time comprises:
            monitoring a time taken to create the previous backup;
            determining a current log replay time; and
            using the time taken to create the previous backup and the current log replay time to determine a current estimated recovery time;
         comparing the current estimated recovery time with the received target recovery time; and
         responsive to determining that the current estimated recovery time has reached a predetermined threshold relative to the received target recovery time, initiating a new backup onto the nonvolatile storage device.

8. The apparatus of claim 7, wherein the process performs further steps comprising:
   determining a number of bytes written to the current log since the start of the previous backup;
   determining a log write bandwidth; and
   dividing the number of bytes written by the log write bandwidth.

9. The apparatus of claim 7 wherein the process performs a further step comprising:
   taking account of a time taken to write a next backup when determining whether a new backup should be initiated.

10. The apparatus of claim 7 wherein the process performs a further step comprising:
    taking account of an estimated time to replay changes logged whilst a next backup is written when determining whether a new backup should be initiated.

11. The apparatus of claim 7 wherein the process performs a further step comprising:
    taking account of other factors when determining whether a new backup should be initiated.

12. The apparatus of claim 7 further wherein the step of comparing the current estimated recovery time with the received target recovery time further comprises:
    determining whether it is not possible to meet the target recovery time; and
    responsive to determining that it is not possible to meet the target recovery time, adjusting the predetermined threshold.

13. A computer program product stored on a computer readable medium, the computer program product comprising program code means adapted to perform a method of adjusting the frequency at which data is backed up, when said computer program product program is run on a computer said method comprises the steps of:
   receiving a target recovery time; and
   determining whether to initiate a new backup, the step of determining whether to initiate a new backup comprising:
      determining a current estimated recovery time, wherein the current estimated recovery time comprises a time taken to replay a previous backup and a time taken to replay logged changes to the previous backup, and wherein the step of determining a current estimated recovery time comprises:
         monitoring a time taken to create the previous backup;
         determining a current log replay time; and
         using the time taken to create the previous backup and the current log replay time to determine a current estimated recovery time;
      comparing the current estimated recovery time with the received target recovery time; and
      responsive to determining that the current estimated recovery time has reached a predetermined threshold relative to the received target recovery time, initiating a new backup.

14. The computer program product of claim 13, wherein the step of determining the current log replay time comprises:
    determining a number of bytes written to the current log since the start of the previous backup;
    determining a log write bandwidth; and
    dividing the number of bytes written by the log write bandwidth.

15. The computer program product of claim 13, further comprising program code means adapted to perform the method of adjusting the frequency at which data is backed up, when said computer program product program is run on a computer said method further comprises the steps of:
    taking account of a time taken to write a next backup when determining whether a new backup should be initiated.

16. The computer program product of claim 13, further comprising program code means adapted to perform the method of adjusting the frequency at which data is backed up, when said computer program product program is run on a computer said method further comprises the steps of:
    taking account of an estimated time to replay changes logged whilst a next backup is written when determining whether a new backup should be initiated.

17. The computer program product of claim 13, further comprising program code means adapted to perform the method of adjusting the frequency at which data is backed up, when said computer program product program is run on a computer said method further comprises the steps of:
    determining whether it is not possible to meet the target recovery time; and
    responsive to determining that it is not possible to meet the target recovery time, adjusting the predetermined threshold.

* * * * *